United States Patent
Cloarec

(10) Patent No.: US 8,206,090 B2
(45) Date of Patent: Jun. 26, 2012

(54) VARIABLE-PITCH VANE OF A TURBOMACHINE

(75) Inventor: Yvon Cloarec, Ecuelles (FR)

(73) Assignee: SNECMA, Paris (FR)

( * ) Notice: Subject to any disclaimer, the term of this patent is extended or adjusted under 35 U.S.C. 154(b) by 935 days.

(21) Appl. No.: 12/194,650

(22) Filed: Aug. 20, 2008

(65) Prior Publication Data

US 2009/0060722 A1 Mar. 5, 2009

(30) Foreign Application Priority Data

Aug. 30, 2007 (FR) ...................................... 07 06074

(51) Int. Cl.
*F01D 17/12* (2006.01)
(52) U.S. Cl. .................. 415/160; 415/174.4; 415/174.5; 415/230
(58) Field of Classification Search ............... 415/173.1, 415/174.1, 159–162, 174.4, 174.5, 208.2, 415/209.1, 230
See application file for complete search history.

(56) References Cited

U.S. PATENT DOCUMENTS

| | | | | | |
|---|---|---|---|---|---|
| 2,950,084 | A | * | 8/1960 | Perry | 415/160 |
| 4,558,986 | A | * | 12/1985 | Faltys | 415/160 |
| 4,604,030 | A | * | 8/1986 | Naudet | 415/126 |
| 4,950,129 | A | * | 8/1990 | Patel et al. | 415/160 |
| 5,314,301 | A | * | 5/1994 | Knight | 415/160 |
| 6,062,813 | A | * | 5/2000 | Halliwell et al. | 415/174.5 |
| 6,443,694 | B1 | * | 9/2002 | Karlsson | 415/115 |
| 6,676,372 | B2 | * | 1/2004 | Scholz et al. | 415/173.2 |
| 6,984,105 | B2 | * | 1/2006 | Clark et al. | 415/160 |
| 7,549,835 | B2 | * | 6/2009 | Brillert | 415/1 |
| 7,850,421 | B2 | * | 12/2010 | Battig et al. | 415/160 |
| 2002/0009361 | A1 | * | 1/2002 | Reichert et al. | 415/110 |
| 2002/0154991 | A1 | | 10/2002 | Bowen | |
| 2006/0245676 | A1 | * | 11/2006 | Bruce et al. | 384/192 |
| 2008/0008574 | A1 | * | 1/2008 | Brillert | 415/1 |
| 2008/0031730 | A1 | * | 2/2008 | Houradou et al. | 415/173.2 |

FOREIGN PATENT DOCUMENTS

| | | |
|---|---|---|
| EP | 0 780 544 A1 | 6/1997 |
| EP | 1 031 703 A2 | 8/2000 |
| EP | 1 120 546 A2 | 8/2001 |
| EP | 1 870 600 A1 | 12/2007 |
| FR | 2 582 720 | 12/1986 |
| FR | 2 902 822 | 12/2007 |
| FR | 2902822 | * 12/2007 |

* cited by examiner

*Primary Examiner* — Steven Loke
*Assistant Examiner* — Victoria Hall
(74) *Attorney, Agent, or Firm* — Oblon, Spivak, McClelland, Maier & Neustadt, L.L.P.

(57) ABSTRACT

A stator stage of a compressor of a turbomachine including an annular row of variable-pitch vanes is disclosed. Each vane includes an external cylindrical pivot defining the axis of rotation of the vane, and an internal cylindrical pivot mounted in a housing of an internal ring. The internal pivot of each vane extends along an axis substantially parallel to the axis of rotation of the vane and at a distance from this axis, and is mounted in the housing of the ring by a swiveling or a tilting system.

6 Claims, 2 Drawing Sheets

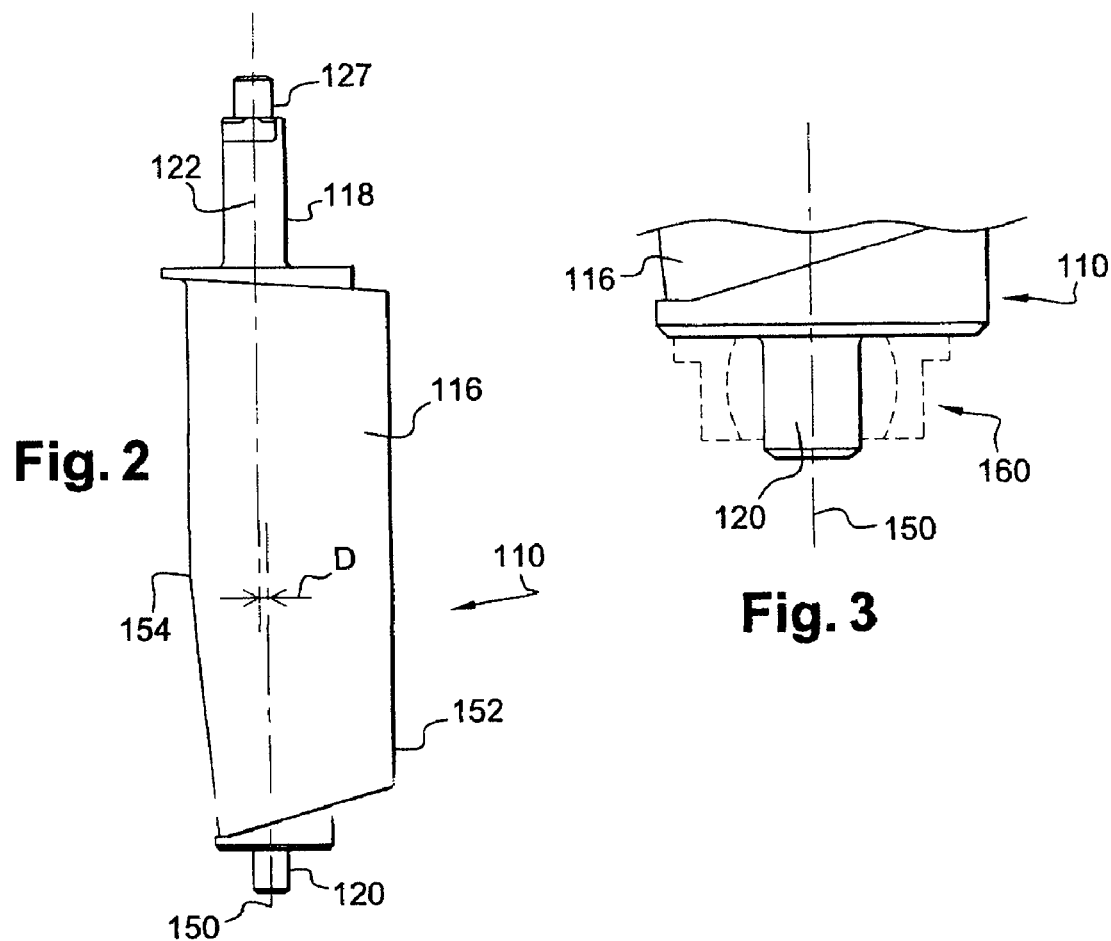
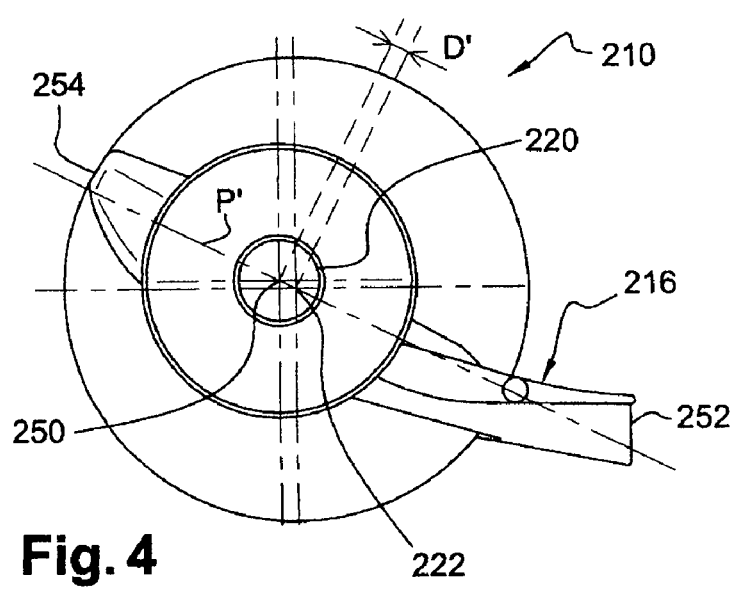

VARIABLE-PITCH VANE OF A TURBOMACHINE

The present invention relates to a variable-pitch vane and also to a stator stage of variable-pitch vanes for a turbomachine such as an aircraft turbojet or turboprop.

BACKGROUND OF THE INVENTION AND DESCRIPTION OF THE PRIOR ART

In a turbomachine, stages of variable-pitch stator vanes are mounted between rotor disks of a compressor. These variable-pitch vanes are supported by a casing of the stator and can be adjusted in position about their axes to optimize the flow of the gases in the engine of the turbomachine.

In the current art, a variable-pitch vane comprises a substantially cylindrical axial pivot at each of its ends, these pivots defining the axis of rotation of the vane. The radially external pivot, termed actuating pivot, is fitted into the housing of a substantially radial or slightly inclined duct of a casing of the turbomachine and is connected by a lever to an actuating ring operated by a ram, an electric motor, or the like. The rotation of the actuating ring is transmitted by the levers to the external pivots of the vanes and causes them to turn about their axes.

The radially internal pivot, termed guide pivot, is fitted into a substantially radial or slightly inclined housing of an internal ring mounted on an annular shroud which bears blocks of abradable material. These blocks of abradable material are intended to cooperate with annular seal teeth provided on the rotor of the turbomachine in order to limit the recirculation of air, from upstream to downstream and from downstream to upstream, radially inside the ring.

The operating cycle of the turbomachine comprises transient modes leading to relative movement in the axial and radial directions between the rotor and the stator, which results in considerable wear on the blocks of abradable material caused by the seal teeth of the rotor rubbing against these blocks.

During the takeoff phase for example, the rotor moves in the radial direction toward the stator and the seal teeth deeply penetrate the blocks of abradable material, forming annular channels in these blocks. The relative movements between the rotor and the stator lead to an axial widening of these channels. During cruise mode, the seal teeth are situated radially set back from these blocks and facing previously formed channels, this resulting in considerable radial clearances between the tips of the seal teeth and the blocks of abradable material, and hence in a low degree of efficiency of the labyrinth seal formed by the seal teeth of the rotor.

Moreover, the relative movements in the axial direction between the rotor and the stator are difficult to predict. To prevent the rotor and the stator from coming into contact with one another during the aforementioned transient modes, the axial clearances between the rotor and the stator are generally increased. However, this solution is not satisfactory since it entails increasing the axial dimension of the engine and the mass of the turbomachine.

SUMMARY OF THE INVENTION

A particular object of the invention is to provide a simple, effective and economic solution to these problems.

Accordingly, the invention provides a stator stage of a compressor of a turbomachine, comprising an annular row of variable-pitch vanes, each vane comprising an external cylindrical pivot which defines the axis of rotation of the vane and is fitted into a substantially radial duct of an external casing, and an internal cylindrical pivot mounted in a corresponding housing of an internal ring, wherein the internal pivot of each vane extends along an axis substantially parallel to the axis of rotation of the vane and at a distance from this vane, and is mounted in the housing of the ring by a swiveling or tilting system.

Each vane of the stator stage differs from the prior art in that the axis of the internal pivot is not aligned and coincident with the axis of rotation defined by the external pivot of the vane. This misalignment of the axes of the pivots makes it possible to axially move the internal ring mounted on the internal pivot of the vane during the angular movement of this vane about its axis of rotation.

Specifically, each vane acts like a connecting rod or a crank provided at its ends with substantially parallel cylindrical pivots, an external pivot supported by a casing of the stator and an internal pivot mounted on an internal ring. The rotational movement of the vane about the axis of the external pivot causes the rotational movement of the internal pivot about this axis and a corresponding movement of the ring, this movement of the ring comprising at least one axial component. The axial travel of the internal ring depends in particular on the maximum angular deflection of the vane and on the axial distance between the axes of the internal and external pivots of this vane.

This invention has many advantages:
  the axial movement of the internal ring makes it possible during operation to vary the relative position of the blocks of abradable material and the seal teeth. It is thus possible, while in cruise mode for example, to move the blocks of abradable material axially in the upstream direction or in the downstream direction such that the seal teeth are not situated opposite channels in the block but, on the contrary, are situated facing surfaces of this block that are not worn or are less worn. The radial clearances between the seal teeth and the blocks of abradable material can therefore be best optimized and adjusted on the basis of the various operating modes of the turbomachine;
  the axial movement of the internal ring can also be controlled to follow the axial movements of the rotor of the turbomachine during the various operating modes. This makes it possible to optimize the axial clearances between the internal ring and the rotor and to reduce the axial dimension and the mass of the turbomachine. The better control over the clearances also makes it possible to reduce the number of seal teeth of the rotor, for example from three to two per stage, these seal teeth being expensive.

According to one embodiment of the invention, the axis of the internal pivot of the vane is situated in a plane passing substantially through the axis of rotation of the vane, and through the leading edge and/or the trailing edge of the vane. The axis of the internal pivot can be situated between the axis of rotation of the vane and the trailing edge of the vane. In a variant, the axis of the internal pivot is situated between the axis of rotation of the vane and the leading edge of the vane.

These various configurations make it possible to move the internal ring axially in the upstream direction and/or in the downstream direction in the turbomachine by rotating the vanes. In a general manner, the position of the axis of the internal pivot with respect to that of the external pivot of the vane is determined on the basis of the axial travel of the internal ring that it is wished to obtain. In certain cases, for a given angular deflection of the vanes about their axes of rotation, the internal ring can adopt two upstream (or downstream) end positions and one downstream (or upstream, respectively) intermediate position.

The rotational movement of the vane causes a movement of the internal ring that can have an axial component and a tangential component. It may prove necessary in certain cases to mount the internal pivot of the vane in the housing of the internal ring by a swiveling or tilting connection in order to allow the axial movement of the ring and avoid the occurrence of stresses at the internal pivot of the vane.

The swiveling system comprises, for example, a ball sleeve made of material with an optimum coefficient of friction defined on the basis of the environmental use conditions, this ball sleeve being fitted onto the internal pivot of the vane and mounted in the housing of the ring.

Advantageously, the internal pivot of the vane is axially slidably mounted in the ball sleeve.

The invention also relates to a turbomachine, such as an aircraft turbojet or turboprop, which comprises at least one stator stage of variable-pitch vanes of the aforementioned type.

BRIEF DESCRIPTION OF THE DRAWINGS

The invention will be better understood and other features, details and advantages of the invention will become apparent on reading the following description given by way of nonlimiting example and with reference to the appended drawings, in which:

FIG. 2 is a schematic side view of a variable-pitch vane according to the invention;

FIG. 3 is a larger-scale view of the internal pivot of the vane shown in FIG. 2; and FIG. 4 is a schematic bottom view of another variable-pitch vane according to the invention.

DESCRIPTION OF THE PREFERRED EMBODIMENTS

Figure 1:
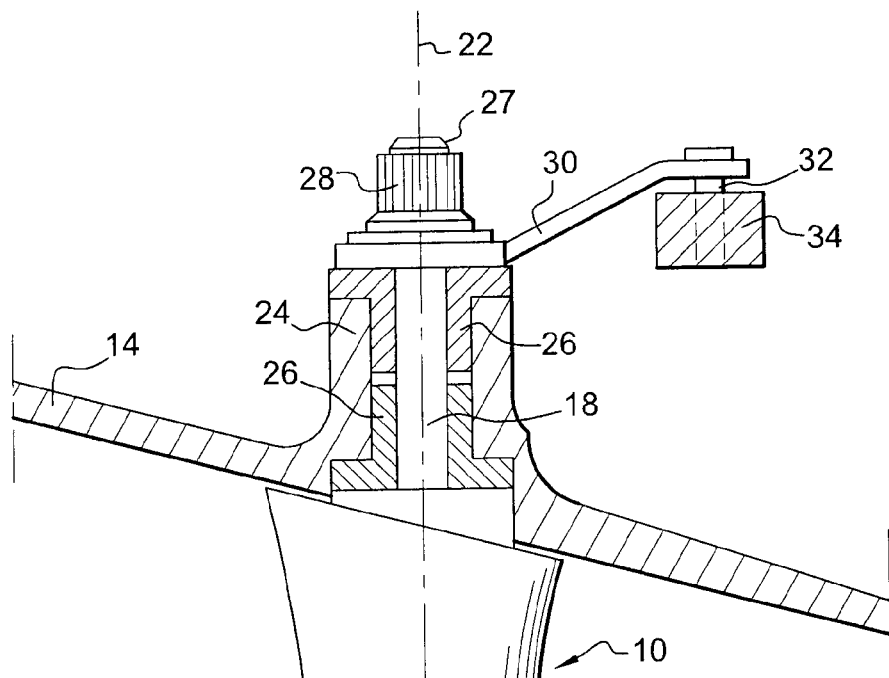
FIG. 1 is a schematic half-view in axial section of a stage of variable-pitch vanes of a high-pressure compressor of a turbomachine, according to the prior art.
Figure 1:
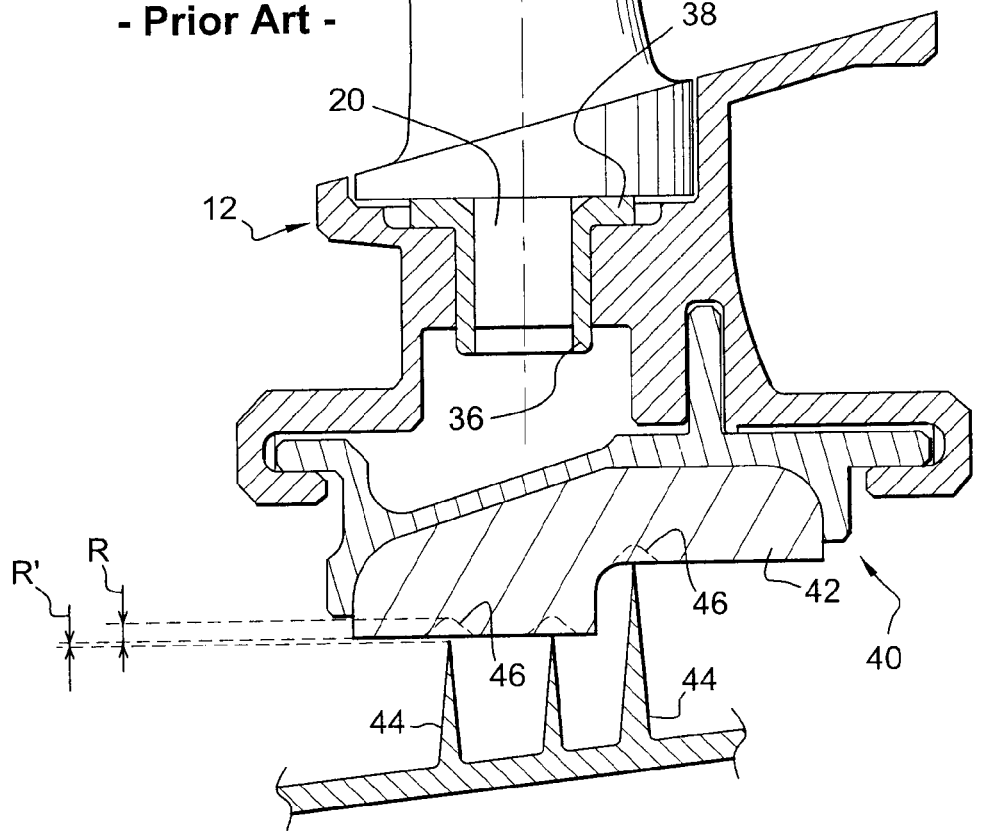

FIG. 1 shows a stator stage of variable-pitch vanes 10 of a high-pressure compressor of a turbomachine, these vanes 10 being distributed about the axis of the turbomachine and extending between an internal ring 12 and an external ring 14 of the turbomachine.

Each vane 10 comprises an airfoil 16 connected at each of its radially internal and external ends to a radial cylindrical pivot 18, 20 which extends along the axis 22 of rotation of the vane.

The external cylindrical pivot 18, or actuating pivot, is fitted into the housing of a cylindrical duct 24 of the casing and is centered and rotationally guided in this duct by cylindrical bushes 26 mounted around the external pivot 18.

The radially external end 27 of the external pivot 18 is fastened by means of a nut 28 to one end of an actuating lever 30. The other end of the actuating lever 30 bears a finger 32 which is rotationally guided in an actuating ring 34 which extends around the axis of the turbomachine, outside the casing 14. An angular movement of the actuating ring 34 about the axis of the turbomachine results in a rotation of the actuating levers 30 about the axes 22 and in the variable-pitch vanes 10 being rotated about these axes.

The internal cylindrical pivot 20, or guide pivot, is fitted into a cylindrical housing of the internal ring 12 and is centered and rotationally guided in this housing by a cylindrical sleeve 36 which is provided at its radially external end with an external annular rim 38 inserted between the radially internal end of the airfoil 16 of the vane and an annular shoulder of the ring 12.

The internal ring 12 is divided into sectors and the ring sectors are held radially on the internal pivots 20 of the vanes by suitable means. At its radially internal end, this ring 12 supports an annular shroud 40 which is likewise divided into sectors and which has blocks 42 of abradable material fastened to the internal periphery thereof. These blocks 42 are intended to cooperate with radial annular seal teeth 44 of the rotor of the turbomachine in order to limit the flow of air axially from upstream to downstream and from downstream to upstream inside the internal ring.

In a variant, the internal ring 12 is formed as a single part and can directly bear a one-piece annular element 42 of abradable material at its internal periphery.

During the operation of the turbomachine, axial and radial relative movements between the rotor and the stator of the engine cause the tips of the seal teeth 44 to rub against internal surfaces of the blocks of abradable material 42, thereby forming annular channels 46 in the blocks and resulting in an increase in the radial clearances R between the tips of the seal teeth and the blocks 42 and in a reduction in the performance of the turbomachine.

The invention makes it possible to at least partially overcome these problems by virtue of the axial movement of the internal ring 12, in the upstream direction or in the downstream direction, such that the tips of the seal teeth 44 are situated opposite internal surfaces of the blocks 42 that are not worn or are less worn, thus leading to optimum radial clearances R' and to lower recirculation of air radially inside the ring 12. This result is obtained by the misalignment of the axes of the internal pivot 20 and the external pivot 18, the axis of the external pivot forming the axis 22 of rotation of the vane.

Exemplary embodiments of the invention have been represented in FIGS. 2 to 4, in which the elements already described with reference to FIG. 1 are designated by the same number incremented by 100 or by 200.

In the embodiment represented in FIG. 2, the axis 150 of the internal pivot 120 extends substantially parallel to and at a slight axial distance D from the axis 122 of rotation of the vane 110. In this example, the axes 122 and 150 are situated in a plane (which is the plane of the drawing) passing through the leading edge 154 and trailing edge 152 of the vane.

The axis 150 of the internal pivot is situated in the aforementioned plane between the axis 122 of the external pivot and the trailing edge 152. When setting the angular pitch of the vane 110, the internal pivot 120 is moved rotationally about the axis 122 of rotation of the vane, thus causing an axial movement of the internal ring. In the intermediate pitch-setting position of the vane, the internal ring has a maximum downstream or retreated position, and in each of the end positions of deflection, this ring has a maximum upstream or advanced position. As has been seen in the foregoing, the axial travel of the ring 12 depends in particular on the maximum angular deflection of the vane and on the distance 0 between the axes 122 and 150.

In the variant represented in FIG. 4, the axis 250 of the internal pivot extends substantially in a plane P' passing through the trailing edge 252 and leading edge 254 of the vane, and it is situated between the axis 222 of rotation of the vane and the leading edge 254. The axes 250 and 222 extend at a slight axial distance D' from one another. In this exemplary embodiment, in the intermediate pitch-setting position of the vane, the internal ring has a maximum upstream or advanced position, and in each of the end positions of deflection, this ring has a maximum downstream or retreated position.

The distances D and D' between the axes of the internal and external pivots are approximately a few millimeters such that the internal ring can be moved in the axial direction over a distance of a few millimeters, for example. The values of these distances D and D' depend in particular on the size of the turbomachine.

When setting the angular pitch of the vanes, the internal ring can move in the axial direction and in the tangential direction over short distances. In order to allow these movements and prevent the occurrence of stresses at the internal pivot of each vane, it is preferable to replace the cylindrical sleeve 36 of the prior art with a ball sleeve.

In the example represented in FIG. 3, the ball sleeve 160 comprises a first swiveling internal element axially slidably mounted on the internal pivot 120 of the vane and a second external element fitted into a corresponding housing of the ring. This second element comprises an external annular rim intended to be inserted between the radially internal end of the airfoil 116 of the vane and the annular shoulder of the ring 12 (FIG. 1).

Of course, the invention is not limited to the embodiments which have been described in the foregoing and represented in the appended drawings. The axis 150, 250 of the internal pivot of the vane could, for example, extend outside of the plane passing through the axis 122 of rotation of the vane and through the leading edge and/or trailing edge of this vane.

The invention claimed is:

1. A stator stage of a compressor of a turbomachine, comprising an annular row of variable-pitch vanes, each vane having outer and inner radial opposite ends, the outer radial end of each vane comprising an external cylindrical pivot which defines an axis of rotation of the vane and is fitted into a substantially radial duct of an external casing, and the inner radial end of each vane comprising an internal cylindrical pivot mounted in a corresponding housing of an internal ring, wherein the internal cylindrical pivot of each vane extends along an axis substantially parallel to the axis of rotation of the vane and at a distance from the axis of rotation of the vane, and is mounted in the housing of the ring by a swiveling system, wherein the internal ring carries at least one block of an abradable material and is configured to be axially moveable in the downstream and/or the upstream direction by rotating each vane about its axis of rotation, wherein said swiveling system comprises a ball sleeve comprising a first swiveling internal cylindrical element slidably mounted on the internal pivot about and along the axis of the internal cylindrical pivot, said ball sleeve further comprising a second external element fitted into the housing of the ring, and wherein the second external element comprises an external annular rim intended to be inserted between the inner radial end of the vane and an annular shoulder of the internal ring.

2. The stator stage as claimed in claim 1, wherein the axis of the internal cylindrical pivot of each vane is situated in a plane passing substantially through the axis of rotation of the vane and through at least one of the leading edge or the trailing edge of the vane.

3. The stator stage as claimed in claim 2, wherein the axis of the internal cylindrical pivot of each vane is situated between the axis of rotation of the vane and the trailing edge of the vane.

4. The stator stage as claimed in claim 2, wherein the axis of the internal cylindrical pivot of each vane is situated between the axis of rotation of the vane and the leading edge of the vane.

5. A turbomachine, comprising at least one stator stage of variable-pitch vanes as claimed in claim 1.

6. The stator stage as claimed in claim 1, wherein the at least one block of abradable material cooperates with seal teeth of a rotor of the turbomachine to limit flow of air.

* * * * *

UNITED STATES PATENT AND TRADEMARK OFFICE
CERTIFICATE OF CORRECTION

PATENT NO.        : 8,206,090 B2                                Page 1 of 1
APPLICATION NO.   : 12/194650
DATED             : June 26, 2012
INVENTOR(S)       : Yvon Cloarec It is certified that error appears in the above-identified patent and that said Letters Patent is hereby corrected as shown below:

Column 6, line 12, after "internal" insert --cylindrical--.

Signed and Sealed this
Fourth Day of September, 2012

David J. Kappos
*Director of the United States Patent and Trademark Office*